United States Patent [19] [11] 4,312,580
Schwomma et al. [45] Jan. 26, 1982

[54] WATERTIGHT HOUSING

[75] Inventors: Otto Schwomma, Gieshübl; Gerhard Raimann, Maria Enzersdorf; Hans P. Breit, St. Pölten, all of Austria

[73] Assignee: Eumig Elektrizitäts- und Metallwaren-Industrie Gesellschaft m.b.H., Wiener Neudorf, Austria

[21] Appl. No.: 104,649

[22] Filed: Dec. 17, 1979

[30] Foreign Application Priority Data

Dec. 21, 1978 [AT] Austria ................................ 9172/78
Feb. 6, 1979 [AT] Austria ................................... 855/79

[51] Int. Cl.³ ........................ G03B 17/08; G08B 21/00
[52] U.S. Cl. ........................................ 354/64; 340/605
[58] Field of Search ........................ 354/64; 352/242; 358/99, 229; 250/227; 340/603–605; 150/52 J; 116/DIG. 7, DIG. 8; 73/40, 49.2, 49.3, 52; 324/65 R

[56] References Cited

U.S. PATENT DOCUMENTS

| | | | |
|---|---|---|---|
| 2,691,134 | 10/1954 | Ford | 73/40 X |
| 3,045,223 | 7/1962 | Kapany et al. | 250/227 X |
| 3,789,297 | 1/1974 | Frolich | 340/605 X |
| 4,025,930 | 5/1977 | Wolff | 354/64 |
| 4,029,889 | 6/1977 | Mizuochi | 340/605 X |
| 4,159,420 | 6/1979 | Tsunoda | 340/605 X |

Primary Examiner—John Gonzales
Attorney, Agent, or Firm—Martin A. Farber

[57] ABSTRACT

A watertight housing, preferably for photographic or cinematographical devices, which has a cover sealed against the penetration of water, which cover can be opened for access to at least one part that is important for putting a device arranged in the housing into operation. Viewed from the outside—behind the cover seal a moisture detector is provided. At least one evaluating device with a warning or signal device is connected to the moisture detector.

25 Claims, 19 Drawing Figures

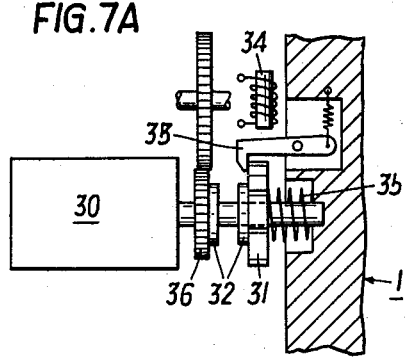
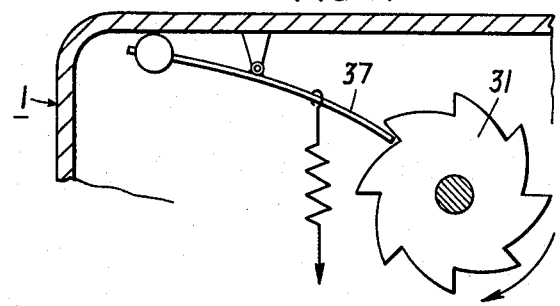
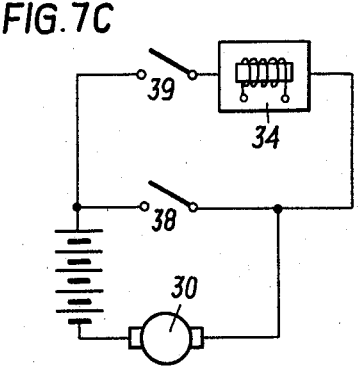
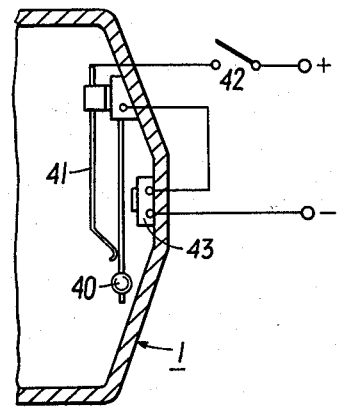
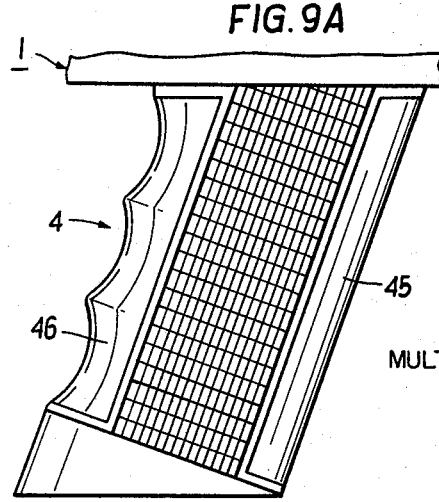
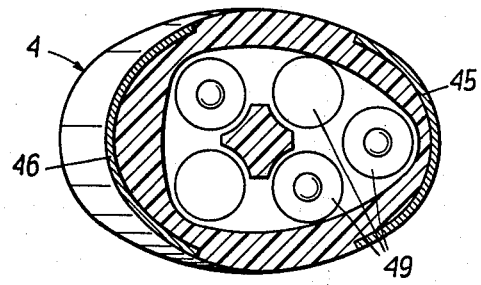
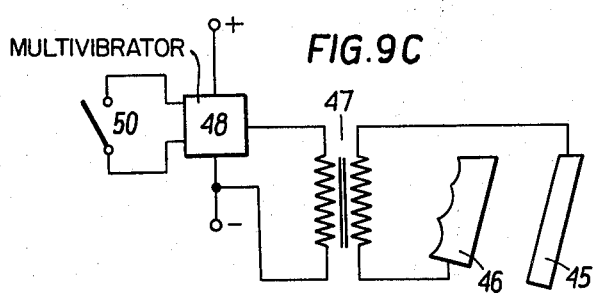

WATERTIGHT HOUSING

The invention relates to a watertight housing, preferably for photographic or cinematographical devices, which has a cover sealed against penetration of water, which cover can be opened for access to at least one part that is important for putting a device arranged in the housing into operation.

With sealing constructions for underwater housings it is of importance to keep the latter free from dirt particles, be it at the seal seat or on the seal itself. Such dirt particles, such as sand grains or hairs undoubtedly lead to water penetration into the interior of the housing whereby the instrument which is contained in the housing can be damaged. Only an immediate surfacing from out of the water in this case can prevent damage.

The invention is based on the object to timely announce water penetration in the housing to the person handling the watertight housing and thereby to make possible the execution of counter-measures.

According to the invention it is proposed that, viewed from the outside—behind the cover sealing (11) a moisture detector (12-15; 20-22; 25-27) is provided, to which moisture detector at least one evaluating device with a warning or signal device (31, 37; 40, 45, 46; 51) is connected.

An optimum protection is provided with the moisture detector which is mounted on the cover-receiving wall and/or on the cover extends over the entire periphery of the cover sealing (FIG. 2), in which case the term "cover" is also to be understood as housing parts, which parts, together with another housing part, form a closed unit.

In the simplest cases moisture detectors of this type have an electric circuit arrangement, whereby the different electrical resistance values and/or dielectric constants of water and air are used in order upon the penetration of water into a space between conductors which are insulated from each other to change the electric characteristics of the circuit and to further convert them into a detection value.

The warning device represents a factor which is not unimportant for the efficiency of the circuit arrangement according to the invention. The simplest is to indicate the water penetration into the housing by means of the flashing on of a small lamp visible from the outside. However, normally the attention of a diver during immersion into the water can hardly be aroused by means of visible signs, in particular through the limited field of vision of the diving mask, as well as in the manner that the diver's attention is turned toward other objects. Therefore an audible signal, for instance a characteristic sound emanating from the camera will be more readily detectable.

Further in accordance with the present invention the moisture detector has two approximately equidistant conductor tracks (12, 15; 21, 22) which are separated from each other, whereby the space therebetween is exposed to penetrating water, such that the electrical resistance and/or the electrical capacitance of the detector changes upon penetration of liquid.

Still further in accordance with the invention the moisture detector is formed as a ready-to-install unit and is insertable into the housing (FIG. 3).

In accordance with another embodiment of the present invention the space between the conductor tracks is filled with dry water-absorbing material, in certain cases the material being provided with an electrolyte.

Also the invention provides that the water-absorbing material is made of at least two layers, of which at least one is provided with water-soluble color, which color upon penetration of water diffuses into the other layer.

Further with the present invention the one conductor track has openings (18) through which openings those places of the originally colorless layer(s) are visible, which places are colored upon penetration of water.

Yet further with the present invention the layer which is provided with water-soluble color on one side surrounds the conductor track (21), on the other side is surrounded by the second layer.

Still further in accordance with the present invention the conductor tracks are made of photo-conductors or light guides (25a, 25b), whereby light is projected into one of the conductors (25a), and upon penetration of water, the light crosses over at the water moistened surface of the light conductor with elimination of total reflection penetrating into the other conductor (25b), a photo-sensitive element (27) being arranged at the end of the conductor (25b).

In accordance with another embodiment of the invention the moisture detector has a light guide or photoconductor (25) at one end of which there is arranged a light source which projects a defined light quantity into the light conductor and at the other end of which there is arranged a light-sensitive element (27), which element (27) detects a loss of light in the light conductor, brought about by the exit of light at a water-moistened surface of the light conductor upon simultaneous suspension of the total reflection.

Also the invention provides the warning device with a lamp (51) preferably mounted on the exterior of the housing.

Still further in accordance with the present invention the warning device has a sound generator (31, 37; 40) for signals audible under water.

Yet further in accordance with the present invention the sound generator has a part (31) which is, for example, actuatable by the claw-motor (30) of an underwater film camera, which motor (30) for example can be brought into engagement with a toothed ratchet or with a ram that strikes against a housing wall.

An additional possibility consists of indicating the water penetration to the person by means of feelable or palpable indications. These palpable signals can for example arise in the manner that the warning device has two parts (45, 46) which parts are to be grabbed by the operator upon handling of the housing, the parts (45, 46) being insulated from each other and being connected to respectively each one pole of a voltage source (49), and the electric circuit in which these two parts are connected is closed by the operator on the one side and by a switch (50), the latter being actuatable by the moisture detector.

With watertight housings one can start out from the fact that the danger of a water penetration increases upon increasing depth of immersion, that is with greater water pressure. Thus with depths where the diver who is handling the housing must put in decompression intervals, or the leaky housing takes in considerable amount of water and possibly is completely filled; thereby an instrument which is present in the housing, for example a movie camera, is destroyed.

Therefore for the creation of additional safety against water penetration with a required longer immersion period, it is proposed that the evaluation device has a gas pressure chamber (104) which is arranged inside the housing, which gas pressure chamber (104) via a conduit (106) is connected with additional housing chambers, and a valve (107, 120) which is to be opened by the moisture detector is provided in this conduit.

The simplest embodiment of a gas pressure chamber in this case is a compressed air cartridge, which is commercially available, the diaphragms of which can be punctured by a spring-biased pin. The pin or ram is released by the moisture detector. It would also be conceivable to seal a housing chamber which stands at pressure by a rotary valve, which valve is actuated by the moisture detector. The housing thereupon is placed at above atmospheric pressure so that further penetration of water at the leaking spot is prevented. The signal for reporting the penetration of water can occur by means of a simple escaping of air bubbles from the housing.

In accordance with the invention a rotary valve (107) is disposed in the conduit (106), which valve (107) by means of a mechanical gearing (111; 112) (which gearing is activatable by the moisture detector) is switchable into a rotary position which position opens the conduit.

Further in accordance with the invention the valve is formed of a diaphragm (120), a pin (121) being disposed opposite to the diaphragm, the pin being prestressed by a spring and releaseable by the moisture detector.

Still further in accordance with the invention an additional conduit (108) is provided which is connected with the gas pressure chamber, the conduit (108) leading from the housing into the open, and consequently by the exiting gas, signals the penetration of water into the housing.

In another embodiment of the present invention a whistle (124) is provided in the additional conduit.

Yet further in accordance with the invention a balloon (126) which can be inflated to the outside is provided in the additional conduit.

With the above and other objects and advantages in view, the present invention will become more clearly understood in connection with the detailed description of preferred embodiments, when considered with the accompanying drawings, of which:

FIGS. 7A and 7B are side and a front portion elevational views of one warning device in accordance with the invention;

FIG. 7C is a circuit diagram of the embodiment of FIGS. 7A and 7B;

FIG. 8 is another warning device in elevational view;

FIGS. 9A and 9B are elevational and bottom views of the handle showing another embodiment of the warning device;

FIG. 9C is a circuit diagram of the embodiment of FIGS. 9A and 9B;

Figure 1:
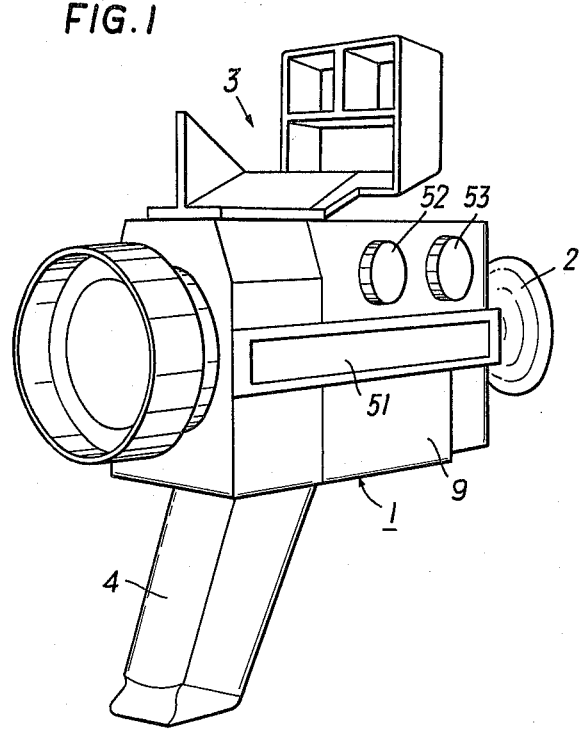
FIG. 1 is a perspective view of a movie camera with a water-tight housing for underwater use or insertion.

Referring now to the drawings, and more particularly to FIG. 1, the housing 1 of a film camera is sealed against the entrance of water with a closed lid for the cassette reception chamber. The camera itself has a reflex finder 2 for normal use in air and a frame finder 3 for use under water. For the handling of the camera, a grip or handle 4 is provided on the housing. Since the camera housing 1 in the example of FIG. 1 itself constitutes the underwater housing, it is necessary to seal all means which are to be operated from the outside (for example the buttons 52 and 53) as well as the cover for the film reception opening. Sealings of such type are per se known, which is why they are not discussed here in more detail.

As mentioned in the introduction, the sealing surfaces of those housing parts which are openable by means of a cover are subject to soiling which can lead to leakiness and consequently to water penetration into the interior of the housing.

Such type of a housing part is formed in the illustrated embodiment example by the cassette reception chamber (FIG. 2), in which the seal for this chamber is arranged on the cover, which cover for the purpose of greater clarity, is not shown. However, in FIG. 2 the contact face thereof on the housing part 5 is indicated as a dot and dashed line 6.

In the cassette reception chamber, which chamber is sealed when the cover is closed, a groove 8 is formed either in the cover or in the housing in the immediate vicinity of the sealing. The groove 8 extends over the entire periphery of the opening, and provides space for the moisture detector.

Figure 2:
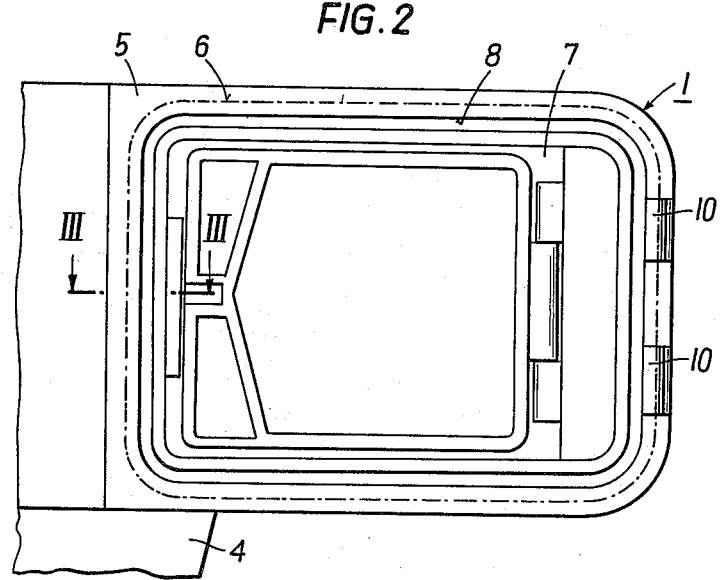
FIG. 2 is a plan view of the reception chamber of the housing for the film cassette of FIG. 1 with the sealing surface, or respectively, with the moisture detector.
Figure 3:
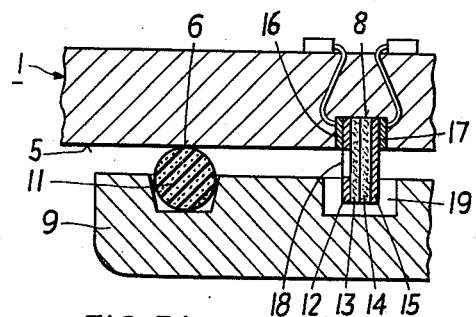
FIG. 3 is a broken-off sectional view of one embodiment of a moisture detector or sensor according to the invention taken along the lines III—III of FIG. 2.

One embodiment of the moisture detector is shown in FIG. 3, which is an illustration taken along the section lines III—III of FIG. 2. The cover 9, which is mounted on the housing in hinges 10 (FIG. 2), supports the seal 11, which seal 11, as mentioned above, is supported on the surface 6. The moisture detector which is arranged in the groove 8 on the housing comprises an electric conducting metal band or strip 12, two water-receptive layers 13 and 14, made for example of blotter-like material, and an additional conductive metal strip 15. The individual layers of the moisture detector are pressed together so that the mounting of this unit could be undertaken also by the operator himself by simple insertion in the groove 8. Fixed contacts 16 and 17 from the electrical connections for the two metal strips 12 and 15, which contacts 16 and 17 are connected each respectively with a terminal or pole of a voltage source. The medium or material between the conductors 12 and 15 has a fixed resistance value which changes when water penetrates into this unit, which can occur either through the perforation 18 of the metal strip 12 or sidewise in the area of the cover recess 19. With this arrangement it is necessary that the cover and the housing are made of nonconductive material, for example plastic material, or that an insulation body is provided between the cover, and respectively, the housing, and the metal strip.

If the layer 14 is colored with a water-soluble color, a diffusion of this color in layer 13 takes place upon water penetration and the position of the water ingress can be located.

Figure 4:
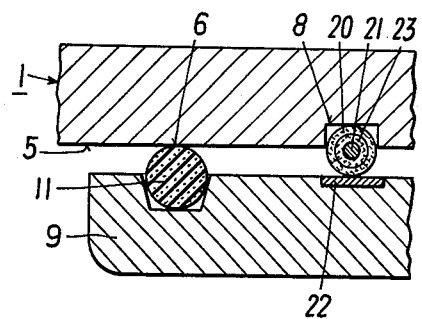
FIG. 4 is a view similar to FIG. 3, but showing another embodiment of a moisture detector.

Another possible embodiment of the moisture detector is shown in FIG. 4. The cover and sealing construction here correspond essentially with the example in FIG. 3, and therefore this is not discussed here in further detail.

The moisture detector which is inserted in the annular groove or slot 8 of the housing has a wick-like metal conductor 21 inside a sleeve 20 made of an absorbent material. The conductor 21 is surrounded by an absorbent layer 23, the layer 23 being provided with a water-soluble color. The material of the sleeves 20 and 23, for example, can be provided with an electrolyte, the latter, upon water ingress, yielding a solution of good electric conductibility and further lowering the detection limit. An electric conductor track 22 is arranged on the cover 9, the track 22 lying opposite to the moisture indicator. The track 22 together with the conductor 21 are connected respectively each to one pole or terminal of a direct DC voltage source, as in the embodiment of FIG. 3. In the event of leakiness of the sealing 11, the area in question is colored or tinted by the water absorption of the casing 20 and also the resistance value of the circuit arrangement is changed, which as a result can lead to the release of an alarm signal.

The evaluation of the information about moisture can, in principle, be made in DC or AC voltage circuits. In case of conductor tracks in which direct current flows through, an increase of the conductance of the layer between the metal strips 12 and 15 is detected. The effect of the conductivity increase can be considerably increased by means of a material that is treated or compounded with electrolyte. In principle, any per se known circuit can be used for the detection of changes in conductivity for the evaluation. A threshold value circuit with a transistor as a comparator is a particularly simple solution.

In measurement with alternating current the increase in capacity of a capacitor which is made of the two metal strips 12 and 15 with the intermediate space between being filled with water as electrolyte can also be used for the detection.

As with the measurement of direct current, the sensitivity of the detector can be increased if a particularly absorbent material between the electrical conductors distributes the penetrated water quantity to a larger portion of the detector length and correspondingly increases the total change or variation of the electric properties of the detector. For the detection of the change in capacity, each of the known circuits is suited for measuring the capacitance, as, for example, the measurement of the frequency change of an RC- or LC-oscillator, the capacitance of which is determined by the capacitance of the moisture detector. A further evaluation possibility is represented by the measurement of impedance or apparent resistance, which measurement detects changes in capacitance as well as in resistance.

Figure 5A:
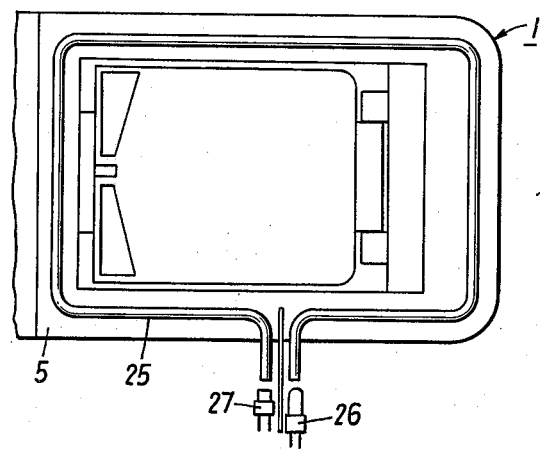
FIGS. 5A and 5B are broken away plan views of an optical moisture detector.
Figure 5B:
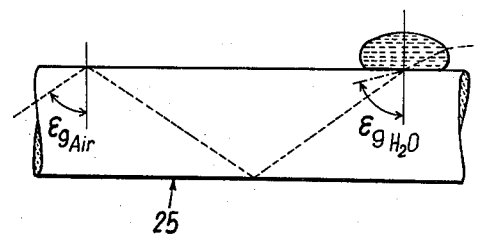
Figure 6A:
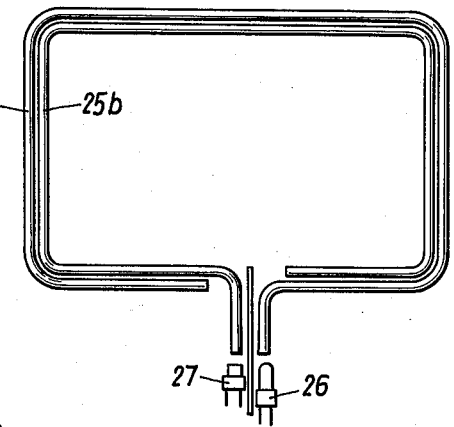
FIGS. 6A, 6B and 6C are respectively, plan, sectional and enlarged views of another optical mositure detector.

A purely optical moisture detector is shown in FIGS. 5A and B, and respectively, FIGS. 6A and B. A homogeneous light conductor 25, which is inserted in the annular groove 8 of the camera housing, is illuminated on one end by a luminescent or light diode 26, while at the other end of the conductor a photo or light receiver 27 receives a light quantity which is defined with sealed conditions. If a water drop arrives at the surface of the photoconductor, light emerges from the conductor on the basis of the change of the total reflection conditions or proportions. Under the assumption that the refractive index number $n_{conductor}$ of the conductor 25 is 1.5, the following conditions, for example, prevail for the limiting angle $\epsilon g$ in the interior of the conductor:

$n_{air} = 1$
$n_{H2O} = 1.33$
$n_{conductor} = 1.5$ air: $\arcsin \epsilon g = \dfrac{n_{air}}{n_{conductor}} = \dfrac{1}{1.5} \quad \epsilon g = 41.8°$ water: $\arcsin \epsilon g = \dfrac{n_{water}}{n_{conductor}} = \dfrac{1.33}{1.5} \quad \epsilon g = 62.45°$ The light beam striking the water drop thus no longer is totally reflected in the angular range between 41.8° and 62.45° and partially exists from the conductor (FIG. 5B). Thereby the light quantity impinging on the photo receiver 26 is decreased, which is utilized for the release of the warning device.

Figure 6B:
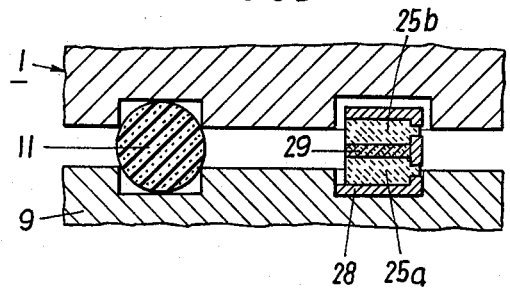
Figure 6C:
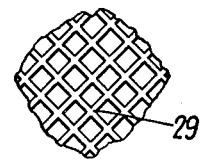

An improvement as compared to the arrangement in FIGS. 5A, 5B is shown in FIGS. 6A and 6B. In the above-described embodiment it is difficult to detect in the photo receiver a smaller change of a per se high signal, which changes, for example, also brought about by the transmitter, would signal a water increase. In FIG. 6A the photodiode 26 receives light only when the entered water connects the light conductor guides 25a and 25b with each other, so that the light which exits from the guide 25a arrives in the guide 25b and is detected at the end of the latter guide. The photo receiver 27, which under dry conditions receives no light would respond upon receiving the smallest light signal and would be formed as an assemblable or ready-to-install unit as FIG. 6B shows.

The conductors made for example of plexiglass are pressed or forced into an angle member 28. The light which is transmitted in the conductor is reflected at the contact surfaces between light conductors 25a, 25b and angle 28, for example by means of reflecting or mirroring of the angle. The angle 28 is attached to a housing part or to the cover. In order to define the mutual distance between the conductors, a mesh 29 of the porous material can be inserted. The water entering behind the sealing 11, continues on between the light conductors 25a, 25b by means of capillary action and makes it possible for the light from the conductor 25a to go over into the conductor 25b.

On the basis of the loss of light occurring with this arrangement it would be more advantageous not to mirror the contact surfaces, to leave an air separation between the conductors and the angle member and to mount the two conductors with light absorbent parts at only a few points.

FIGS. 7 and 8 show warning devices for palpable and accoustic signals. In FIGS. 7A to 7C a purely mechanical warning device for accoustical signals is shown. A ratchet wheel 31 on a gripper or claw motor 30 is couplable via friction discs 32. A catch or pawl 33, however, prevents this coupling together until a solenoid 34 is activated by the moisture detector, whereupon the catch lever 34 is pivotally lifted toward the solenoid 34 and the wheel 31 under the action of a compression spring 35 engages against the motor pinion or gear 36. A resilient projection 37 engages in the rotating wheel 31 under the action of a spring, which projection in so doing produces a rattling sound (FIG. 7B). The projection 37 is centrally pivotally mounted to the housing and at its free end has an attachment to knock against the housing.

Since this warning device must be able to be switched on even with a non-actuated main-switch for the claw motor 30, the switch 39 of the moisture detector is arranged in parallel to the main switch 38 (FIG. 7C).

FIG. 8 shows an acoustic sound generator for a warning device in form of the bell principle. A bell hammer 40 which in the rest position lies against a contact spring 41, is drawn by a solenoid 43 upon the closing of the moisture detector 42, and in subsequent order via the intermittently interrupted circuit strikes against the housing wall 1.

The material and form of the housing wall of this are chosen such that a good acoustic coupling with the surrounding water is guaranteed, that is to say the signals are well-heard or perceived under water.

Finally, in FIG. 9, a palpable warning device is shown comprising a so-called "electrifying circuit". With this it is assumed that the operator holds the instrument upon diving into the water and does not carry it along loosely attached. In the illustrated embodiment, the handle 4 of the camera is provided with two conductor plates 45 and 46 which are insulated from each other, which plates 45 and 46 are each connected respectively to a transformer 47 (FIG. 9C). The primary winding of the transformer is connected to an astable multivibrator 48, which multivibrator 48 is connected to a voltage source via the battery 49. The actuation of the astable multivibrator 48 takes place by means of the moisture detector switch 50. Consequently an electric shock is given to the operator, who with the hand short-circuits the two contact plates 45, 46. It is self-evident that the amount of the electric "shock" is not allowed, for safety reasons, to surpass a given magnitude.

Figure 10:
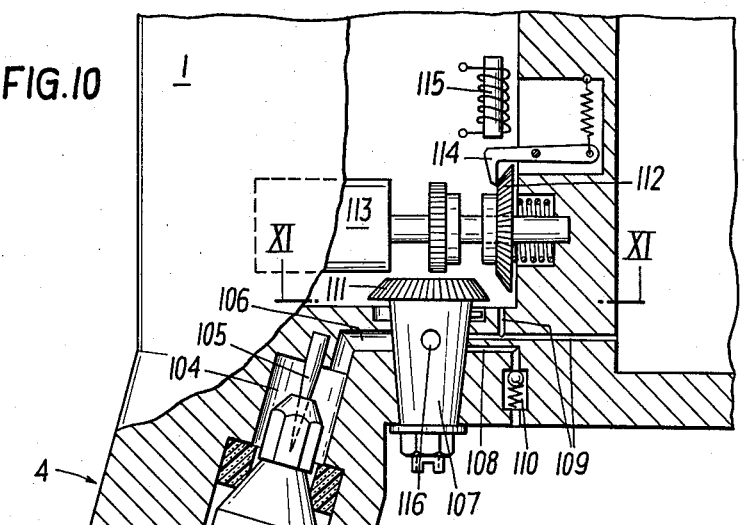
FIG. 10 is a broken away sectional view of a water-tight housing formed as a camera housing with a compressed air chamber according to the invention.
Figure 11:
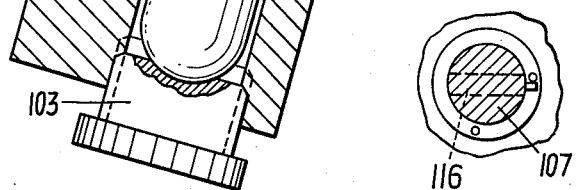
FIG. 11 shows a section of the valve or vent arrangement of the device according to FIG. 10 taken along the section lines XI—XI of FIG. 10.

In FIG. 10 an evaluation or plotting device is shown. The movie camera housing 1 has a compresed-air cartridge 102 in the handle, which cartridge with a screw cap 103 is screwed into a chamber 104. Therewith a pin 105 pierces the diaphragm of the cartridge, whereby the chamber 104 is pressurized. A conduit 106 in the normal condition of the instrument is closed or sealed by a rotary valve 107. On the side of the rotary valve which side is opposite the conduit 106, the latter branches out into partial conduits 108 and 109. Whereas the conduits 109 lead into the interior of the housing into additional chambers, the conduit 108 via a safety or pressure relief valve 110 leads to the exterior.

The rotary valve 107 has a bevel toothed gearing 111, to which bevel gearing 111 a bevel gear wheel 112 is coordinated. This bevel gear wheel 112 sits displaceably in the axial direction on a drive shaft of the film transport motor 113 or of another motor. A spring biassed pivotally mounted detent 114 controllable by the moisture detector (not shown) prevents the coupling of the bevel gear wheel 112 to the motor 113 via friction discs similar to the embodiment of FIG. 7.

If water enters the housing, then the moisture detector (which detector for example is formed according to one of the embodiments in FIGS. 3 to 6) actuates the solenoid 115, whereby the detent or catch 114 is released by pivoting up toward the solenoid 115. The compression spring presses to gear 112 toward the motor 113. By means of the subsequent operative coupling of the bevel gear 112 to the shaft of the motor 113 via the friction discs or other gearing means, the starting torque is transferred to the toothed gearing 111 via the gear 112. By this operation the rotary valve 107 places the bore 116 therethrough aligned communicatingly opposite the conduit 106 and admits therethrough compressed air which flows out of the chamber 104 flowing thereby into the interior of the additional housing via the branch conduits 109. Toward the outside the air bubbles rising from the channel 108 signal the diver of the penetration of water into the housing, and respectively, the pressure placed on the camera.

Figure 12:
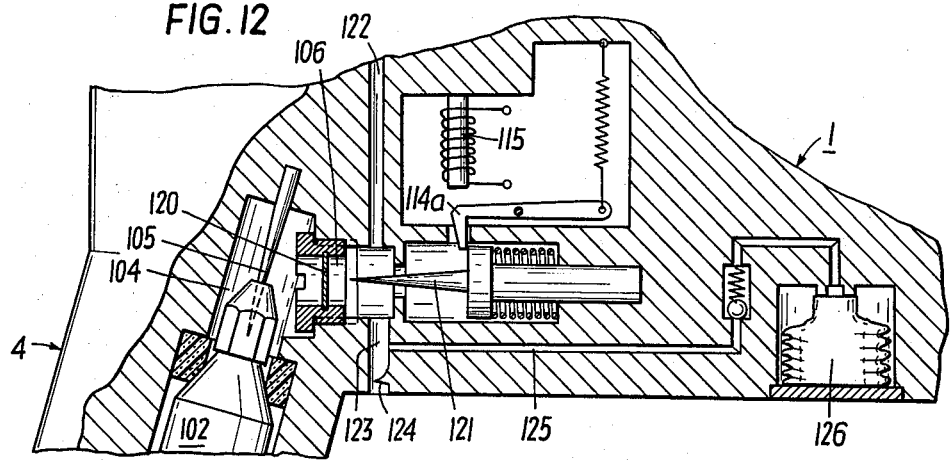
FIG. 12 is a sectional view of another embodiment of the invention in which the release of the compressed air cartridge takes place in a simple manner by another pin.

In FIG. 12 an embodiment example of the invention is shown in which the compressed air cartridge 102, which is inserted into the housing 1 in the same fashion as in FIG. 10, produces pressure above atmospheric in the chamber 104. A diaphragm 120 prevents air from blowing out of the conduit 106.

Similar to the release of the bevel gear wheel for the coupling to the motor according to FIG. 10, a catch 114a controllable by the moisture detector and cooperating with a solenoid is provided, which catch 114a holds a spring-biased pin 121 in a pulled-up position. The latter penetrates the diaphragm 120 upon actuation of the moisture detector thereby actuating the solenoid and lifting the catch 114a, so that via channel 122 the remaining housing is pumped full of air. Simultaneously via channel 123 a whistling sound can be emitted from the channel constriction or contraction 124, and via channel 125 and a spring-biased valve a balloon 126 can be inflated, which balloon 126 comes out of the housing and pulls the housing upward.

The invention is not to be understood as being limited to the embodiments shown. Thus it is possible, for example, to use the moisture detector not only with movie cameras, but anywhere with housings which receive instruments in their interior. Such housings can be lamp cases, casings for measuring devices or also housings for cameras themselves. Also the indication of water penetration as introductorily mentioned, could take place in a purely optical manner, for example by means of an illuminated field or area 51 on the exterior of the housing.

We claim:

1. A watertight housing, preferably for photographic or cinematographical devices, which has a cover sealed against penetration of water, the cover being openable for access to at least one part that is important for putting a device arranged in the housing into operation, comprising
cover sealing means for sealing the cover,
a moisture detector being disposed—viewed from the outside—behind said cover sealing means,
at least one evaluating device including a signal device being connected to said moisture detector.

2. The watertight housing as set forth in claim 1, wherein
said moisture detector is mounted on said cover and extends over the entire periphery of said cover sealing means.

3. The watertight housing, as set forth in claim 1, wherein
said housing includes a cover receiving wall, said cover is mounted in said receiving wall,
said moisture detector is mounted on said cover receiving wall and extends over the entire periphery of the said cover sealing means.

4. The watertight housing, as set forth in claims 1, 2 or 3 wherein
said moisture detector comprises two conductor tracks which are approximately equidistantly separated from each other and define a space therebetween communicatable to water penetrating into the housing, whereby electrical characteristics of the moisture detector change upon penetration of the water.

5. The watertight housing, as set forth in claim 4, wherein
said mositure detector is formed as a ready-to-install unit and is insertable into the housing.

6. The watertight housing, as set forth in claim 4, wherein
said space between said conductor tracks is filled with dry, water-absorbing material.

7. The watertight housing, as set forth in claim 6, wherein
said water-absorbing material is provided with an electrolyte.

8. The watertight housing, as set forth in claim 6, wherein
said water-absorbing material is made of at least two adjacent layers, at least one of said layers is provided with water-soluble color, said color upon penetration of water into said at least one layer difuses into another of said layers.

9. The watertight housing, as set forth in claim 8, wherein
said another of said layers is normally colorless,
one of said conductor tracks is formed with openings adjacent said another of said layers, whereby through said openings adjacent portions of said another of said layers are visible, said portions becoming colored upon penetration of water into said at least one layer which is provided with said water-soluble color.

10. The watertight housing, as set forth in claim 8, wherein
said at least one layer which is provided with water-soluble color on one side thereof surrounds one of said conductor tracks, and on the other side is surrounded by said another of said layers.

11. The watertight housing, as set forth in claim 4, wherein
said conductor tracks comprise adjacent light guides,
means for projecting light into one of said light guides,
a photo-sensitive element being arranged at an end of another of said light guides, whereby upon penetration of water into the watertight housing onto a surface of said one light guide, the light in said one light guide crosses over at the water-moistened surface of said one light guide with elimination of total reflection and enters into said other light guide.

12. The watertight housing, as set forth in claim 1, wherein
said moisture detector comprises,
a light guide,
means comprising a light source operatively disposed at one end of said light guide for projecting a defined quantity of light into said light guide,
means comprising a photo-sensitive element operatively disposed at the other end of said light guide for detecting a loss of light in said light guide due to exiting of light at a water-moistened surface of the light guide with simultaneous elimination of the total reflection upon a penetration of water into the watertight housing onto the surface of said light guide.

13. The watertight housing as set forth in claim 1, wherein
said signal device includes a lamp.

14. The watertight housing as set forth in claim 13, wherein
said lamp is mounted on an exterior of the housing.

15. The watertight housing as set forth in claim 1, wherein
said signal device comprises a sound generator means for producing for signals audible under water.

16. The watertight housing as set forth in claim 15, wherein
said sound generator means includes a toothed ratchet,
a claw-motor of an underwater film camera in the housing,
means for operatively engaging said motor with said toothed ratchet.

17. The watertight housing as set forth in claim 15, wherein
said sound generator means includes a ram means for striking against a wall of the housing,
a claw-motor of an underwater film camera,
means for operatively engaging said motor with said ram means.

18. The watertight housing as set forth in claim 15, wherein
said sound generator includes a means actuatable by said moisture detector for operatively producing a banging noise on the housing.

19. The watertight housing as set forth in claim 1, wherein
said signal device comprises two parts adapted to be grabbed by the operator upon handling of the housing,
an electric circuit includes a voltage source having poles, a switch and said two parts,
said parts are insulated from each other and are operatively connected to respectively each one of said poles of said voltage source,
said electric circuit is closed by the operator and by said switch,
said switch is operatively connected to said moisture detector, and the latter constituting means for actuating said switch when water enters the housing, whereby upon water penetration into said housing a palpable voltage signal is given to the operator.

20. The watertight housing as set forth in claim 1, wherein
said evaluation device includes a gas pressure chamber formed inside said housing,
conduit means for connecting said gas pressure chamber with additional chambers formed in said housing, and
valve means for being opened by said moisture detector when water penetrates into the housing, said valve means is disposed in said conduit means.

21. The watertight housing as set forth in claim 20, further comprising
said valve means comprises a rotary valve disposed in said conduit means,
mechanical gearing means operatively connected to said moisture detector for being activatable by said moisture detector for switching said rotary valve into a rotary position which opens said conduit means.

22. The watertight housing as set forth in claim 20, wherein said valve means comprises a diaphragm, pin means for piercing said diphragm is disposed opposite to said diaphragm, spring means for prestressing said pin means toward said diaphragm, said pin means is operatively connected to and releasable by the moisture detector.

23. The watertight housing as set forth in claim 20, further comprising an additional conduit is connected with said gas pressure chamber via said valve means, said additional conduit leads from the housing into the open, whereby upon penetration of water into the housing and the exiting of gas through said additional conduit into the open, the penetration of water into the housing is signalized.

24. The watertight housing as set forth in claim 23, further comprising a whistle disposed in said additional conduit.

25. The watertight housing as set forth in claim 23, further comprising a balloon inflatable toward the outside is communicateably disposed in said additional conduit.

* * * * *